(12) United States Patent
Lambert et al.

(10) Patent No.: US 7,970,384 B1
(45) Date of Patent: Jun. 28, 2011

(54) ACTIVE PHONE BOOK ENHANCEMENTS (75) Inventors: Paul Aerick Lambert, Mountain View, CA (US); Lu Chang, Cupertino, CA (US)

(73) Assignee: PicoMobile Networks, Inc., Sunnyvale, CA (US)

( * ) Notice: Subject to any disclaimer, the term of this patent is extended or adjusted under 35 U.S.C. 154(b) by 874 days.

(21) Appl. No.: 11/782,422

(22) Filed: Jul. 24, 2007

Related U.S. Application Data (60) Provisional application No. 60/860,526, filed on Nov. 21, 2006.

(51) Int. Cl.
 *H04L 12/58* (2006.01)
(52) U.S. Cl. .................. 455/412.1; 455/466; 455/435.1; 455/414.2; 455/550.1
(58) Field of Classification Search .................. 455/566, 455/412.1, 412.2, 413, 414.1, 415, 416, 420, 455/425, 567, 115.3, 435.1, 404.2, 433, 445, 455/411, 550.1; 379/88.13; 345/157; 370/352, 370/351, 328, 338, 401; 709/203; 705/1, 705/51
See application file for complete search history.

(56) References Cited

U.S. PATENT DOCUMENTS

| | | | |
|---|---|---|---|
| 5,738,583 A | 4/1998 | Comas et al. |
| 6,272,120 B1 | 8/2001 | Alexander |
| 6,600,726 B1 | 7/2003 | Nevo et al. |
| 6,690,935 B1 | 2/2004 | Calot et al. |
| 6,704,866 B1 | 3/2004 | Benayoun et al. |
| 6,707,801 B2 | 3/2004 | Hsu |
| 6,760,587 B2 | 7/2004 | Holtzman et al. |
| 6,785,892 B1 | 8/2004 | Miller |
| 6,788,675 B1 | 9/2004 | Yang |
| 6,793,580 B2 | 9/2004 | Sinclair et al. |
| 6,795,701 B1 | 9/2004 | Baker et al. |
| 6,799,056 B2 | 9/2004 | Curley et al. |
| 6,859,460 B1 | 2/2005 | Chen |
| 6,879,574 B2 | 4/2005 | Naghian et al. |
| 6,879,812 B2 | 4/2005 | Agrawal et al. |
| 6,909,705 B1 | 6/2005 | Lee et al. |
| 6,932,698 B2 | 8/2005 | Sprogis |
| 7,013,391 B2 | 3/2006 | Herle et al. |
| 7,072,323 B2 | 7/2006 | Roberts et al. |
| 7,073,129 B1 | 7/2006 | Robarts et al. |
| 7,085,257 B1 * | 8/2006 | Karves et al. .................. 370/352 |
| 7,097,562 B2 | 8/2006 | Gagner |
| 7,143,171 B2 | 11/2006 | Eriksson et al. |
| 7,181,544 B2 | 2/2007 | Vangal et al. |
| 7,224,964 B2 | 5/2007 | Souissi et al. |
| 7,236,772 B1 | 6/2007 | Botzas |
| 7,251,235 B2 | 7/2007 | Wentink |
| 7,324,444 B1 | 1/2008 | Liang et al. |
| 7,400,722 B2 | 7/2008 | Qi et al. |
| 7,440,430 B1 | 10/2008 | Jagadeesan et al. |
| 7,452,278 B2 | 11/2008 | Chen et al. |
| 2002/0151366 A1 | 10/2002 | Walker et al. |

(Continued)

OTHER PUBLICATIONS

IEEE Standards Board.IEEE 802.11 Standard, 1999. 1999 Edition (R2003).

(Continued)

*Primary Examiner* — Tan Trinh (57) ABSTRACT

The present invention is a phonebook system including a mobile, wireless communications device having a microprocessor and user interface giving the user the capability of inputting, accessing, and modifying communication recipient identities, state data required to establish and/or enhance a communication session between the communications device and one or more recipients, and expanded information data.

20 Claims, 4 Drawing Sheets

U.S. PATENT DOCUMENTS

| | | |
|---|---|---|
| 2002/0191560 A1 | 12/2002 | Chen et al. |
| 2002/0199124 A1 | 12/2002 | Adkisson |
| 2003/0069018 A1 | 4/2003 | Matta et al. |
| 2003/0182454 A1 | 9/2003 | Huth et al. |
| 2003/0231625 A1 | 12/2003 | Calvignac |
| 2004/0066751 A1 | 4/2004 | Tseng et al. |
| 2004/0105415 A1 | 6/2004 | Fujiwara et al. |
| 2004/0127277 A1 | 7/2004 | Walker et al. |
| 2004/0174829 A1 | 9/2004 | Ayyagari |
| 2004/0185851 A1 | 9/2004 | Nagai |
| 2004/0196808 A1 | 10/2004 | Chaskar et al. |
| 2005/0025163 A1 | 2/2005 | Christie |
| 2005/0032577 A1 | 2/2005 | Blackburn et al. |
| 2005/0041660 A1 | 2/2005 | Pennec et al. |
| 2005/0041793 A1* | 2/2005 | Fulton et al. ............. 379/211.01 |
| 2005/0073980 A1 | 4/2005 | Thomson et al. |
| 2005/0079873 A1 | 4/2005 | Caspi et al. |
| 2005/0099977 A1 | 5/2005 | Williams et al. |
| 2005/0157661 A1 | 7/2005 | Cho |
| 2005/0177639 A1 | 8/2005 | Reunamaki et al. |
| 2005/0181872 A1 | 8/2005 | Acharya et al. |
| 2005/0197189 A1 | 9/2005 | Schultz |
| 2005/0250487 A1 | 11/2005 | Miwa et al. |
| 2005/0250497 A1 | 11/2005 | Ghosh et al. |
| 2005/0268003 A1 | 12/2005 | Wang et al. |
| 2005/0286456 A1 | 12/2005 | McNew et al. |
| 2006/0041750 A1 | 2/2006 | Carter et al. |
| 2006/0045138 A1 | 3/2006 | Black et al. |
| 2006/0063539 A1 | 3/2006 | Beyer |
| 2006/0135262 A1 | 6/2006 | Kennedy et al. |
| 2006/0172736 A1 | 8/2006 | Nevo |
| 2006/0205409 A1 | 9/2006 | Chiou et al. |
| 2006/0221857 A1* | 10/2006 | Bushnell et al. ............. 370/254 |
| 2006/0268711 A1 | 11/2006 | Doradla et al. |
| 2007/0026866 A1 | 2/2007 | Krishnamurthi et al. |
| 2007/0035513 A1* | 2/2007 | Sherrard et al. ............. 345/157 |
| 2007/0047547 A1 | 3/2007 | Conner et al. |
| 2007/0047697 A1* | 3/2007 | Drewry et al. ............. 379/88.13 |
| 2007/0060355 A1 | 3/2007 | Amaitis et al. |
| 2007/0076683 A1 | 4/2007 | Chung |
| 2007/0082671 A1 | 4/2007 | Feng et al. |
| 2007/0086394 A1 | 4/2007 | Yamada et al. |
| 2007/0099703 A1 | 5/2007 | Terebilo |
| 2007/0197237 A1 | 8/2007 | Powell et al. |
| 2007/0202910 A1 | 8/2007 | Brewer et al. |
| 2008/0039015 A1 | 2/2008 | Nakata et al. |
| 2008/0069105 A1 | 3/2008 | Costa et al. |
| 2008/0095112 A1 | 4/2008 | Wiemann et al. |
| 2008/0123608 A1 | 5/2008 | Edge et al. |
| 2009/0191878 A1 | 7/2009 | Hedqvist et al. |
| 2009/0222358 A1* | 9/2009 | Bednarek ........................ 705/27 |
| 2010/0093374 A1 | 4/2010 | Dacosta et al. |

OTHER PUBLICATIONS

Newton, Harry. Newton's Telecom Dictionary. 15th Edition. Miller Freeman Inc., 1999. 762. (3 pages).

* cited by examiner

ACTIVE PHONE BOOK ENHANCEMENTS

This application claims benefit and priority of Provisional Application Ser. No. 60/860,526 filed Nov. 21, 2006.

FIELD OF THE INVENTION

The present invention relates to mobile wireless communication devices having a listing of communication contacts and communication link information associated therewith.

BACKGROUND OF THE INVENTION

Communication via cellular telephone networks by way of mobile, wireless communication devices presently includes a capacity, in many cellular networks, to transmit a short message. The Short Message Service (SMS) comprises a very short text message (a typical limitation is 160 characters) composed at a sender client and transmitted via wireless cellular communication to a Short Message Service Centre (SMSC) which operates upon received short messages to first store the short message, determine a recipient client, and forward the stored message. The operation of a message center relieves the wireless device of the sender client from the task of assuring the transmission operation to a recipient client is completed as required. The SMSC attempts to send messages to a recipient client. If a recipient client is not reachable, the SMSC queues the message for later retry. Some SMSC's also provide a "forward and forget" option where transmission is tried only once. Both Mobile Terminated (MT), for messages sent to a mobile handset, and Mobile Originating (MO), for those that are sent from the mobile handset, operations are supported. Message delivery is best effort, so there are no guarantees that a message will actually be delivered to its recipient and delay or complete loss of a message is not uncommon, particularly when sending between networks. Sender clients may obtain delivery reports for transmitted short messages. These reports provide positive confirmation that the short message reached the recipient client. SMS is a very effective form of communication for short messages where the recipient client cannot presently receive a wireless communication (out of radio range), is not able to take a call, etc. SMS does not use Internet connection for delivery of the text message, thereby eliminating a requirement for Internet connection by the sender client. SMS guarantees relative privacy as opposed to transmission of an identical email transmission via Internet communication. SMS is a very secure and private person-to-person communication in the realm of wireless communications.

Instant messaging via Internet (or equivalent network supporting packet transmissions) is well known as a standard by which single lines of text are transmitted between a two or more communicating clients via support of an instant messaging server. The transmissions of lines of text is so fast that participants in an instant messaging communication session experience each other's transmissions as real time exchanges, providing for the sort of instant response a human will typically require for engaging in personal communications. A short period of waiting for the next text response from the sender actually enhances anticipation of the communications and significantly changes the subject matter and manner in which it is presented over duplex communications by telephone communications.

Instant messaging has been faulted in basic design for failing to provide security from interception and virus attack and many other shortcomings. Most of these shortcomings arise from the fact that the IM system was designed without business or government oversight or specification as just an unhindered way to quickly exchange brief thoughts in real time. The benefits of IM have greatly outweighed the disadvantages for communications between personal computers linked by wired connections or similarly reliable connections with the Internet. The actual transmission of a line of text is made as packetized data, greatly enhancing the speed and efficiency of transmission as compared with systems which transmit a line of text as stream of text signals. However, mobile communications devices currently experience serious limitations when enhanced to connect with the Internet via the cellular network, i.e., instant messaging is subject to sometimes slow data transfer rates and is also often subject to additional per-kilobyte charges by the cellular network for their handling of the Internet traffic.

Mobile, wireless communication devices, such as cellular telephones, have long been provided with microprocessors which comprise a memory capable of storing data about a specific person or business and associating with that person or business other information such as a phone number or address. These cellphone active phonebooks are ubiquitous in cellular telephones and are generally input by a user either through alphanumeric text input through a push button keypad or by direct data transfer from the user's own personal computer or from data stored at servers of the cellular system which may be transmitted for storage with appropriate authorization. In some cellular phones, notes, selection characteristics, or other data may be associated with a phone book entry. For example, a person's name may be associated with a data category of a relative and an emergency phone contact. The user wishing to display all relatives who are emergency phone contacts may use the cellular phone's menu and user interface to enter these criteria in a search of the phone book, whereafter the results are displayed on the liquid crystal display of the cellular phone are used in other ways.

Mobile devices capable of placing telephone calls provide phonebooks as one of number of menu selections that a user elects to display on a relatively limited display screen on that mobile device. Presently, the selections in a phonebook submenu that a user may make are relatively limited and tend to become static over time, as changes require manual user input by way of the touchpad buttons available in a typical mobile device such as a cellular phone or similar mobile telecommunications device.

In one specific application to cellular phones with SMS capability, a user may select an entry in the phone book and thereafter transmit a composed short message without having to enter the entire communication link information of the recipient.

There is a need for integration of the short message capabilities of wireless cellular communication devices enabled with phone book capabilities to improve communication opportunities of a user.

SUMMARY OF THE INVENTION

The present invention is a phonebook system including a mobile, wireless communications device having a microprocessor and user interface giving the user the capability of inputting, accessing, and modifying communication recipient identities, state data required to establish and/or enhance a communication session between the communications device and one or more recipients, and expanded information data.

Multiple embodiments to a mobile device active phonebook are presented herein as part of the invention system. One such embodiment includes transmission of state data concerning a communication recipient to the mobile device for display or audible delivery of such data, whereupon the mobile device may comprise means for automatic response or may respond only upon additional input from a user.

State data generally relates to communications capabilities of a mobile device or a recipient device. Expanded information data generally relates to information useful or of interest to a user about a recipient using a recipient device. Some or all of the state data and the expanded information data may be displayed on a display screen of the mobile device according to selections made by a user of the mobile device. In a preferred embodiment, a menu selection from a displayed main menu of the mobile device indicates that a sub-menu of options is available as a phone book and/or contacts list. The invention system enhances the information available for viewing by a user of the mobile device relating to a specific phonebook item related to a recipient of telephone communications. A person's name or nickname is a common identifier for a specific phonebook entry. Selection of a recipient's identifier from the sub-menu of a phonebook in the mobile device offers for selection for display or displays state data or enhanced information data for the user.

State data may include a current open line status of a recipient device. The open line status can be determined by periodic transmissions from the recipient device, by response of the recipient device (without causing a ring or indication of incoming call for the recipient device) to a query from the mobile device at the input of a user or by periodic queries transmitted to the recipient device. A user viewing the open line status of a recipient device allows the user to know whether to input a communication link information, such a phone number, to attempt communication with the recipient device. State data may also include the number of calls a recipient device has received in a recent time period or the total amount of time the recipient device has been engaged in phone calls. A user viewing this information can determine whether they should interrupt a recipient's clearly busy communications schedule.

State data may also include a transmission from the recipient device that is a request for the user, or all similarly equipped users, not to presently call, call only in a preferred time slot, or call as soon as possible. Requests for state data (or expanded information data) of a recipient device is preferably conducted very quickly and without causing the recipient device to ring or otherwise cause a recipient to detect that a phone call is incoming. Similarly, reception by the mobile device of responses to queries for data or reception by the mobile device of non-queried data relating to the recipient device is preferably performed without indication of a ring tone or other indication of an incoming call. Optionally, a recipient device may store and/or cause to be displayed such requests for state data and the contact information of the requester, whereby the recipient may choose to contact the requester and/or change state data of the recipient device for purposes of later inquiries to the recipient device. State data may also include the type of recipient device in use, i.e., a cellular phone, a PSTN wired or wireless phone, a Wi-Fi enablement of the recipient device, the cellular service provider of the recipient device, a current or future location of the recipient, signal strength of the recipient device's mobile service provider in the current area, battery strength of a mobile recipient device, presence of the recipient device within broadcast communication range of a Wi-Fi network (for potential hand-off to VoIP communication via an Internet connection through the Wi-Fi network), and other useful state information of either the mobile device or the recipient device.

Expanded information data includes location related information about the physical location of a recipient device and/or time of day in the location of the recipient device. Display of expanded information data at the display screen of the mobile device and/or the recipient device include a time zone indicator comprising text and/or graphic presentation indicating that the recipient device is in a time zone where it is daytime and another presentation when it is night. A light-indicating icon (such as a rayed sun or circle indicated by a thin line at the circumference) displayed on the mobile device screen could indicate that a recipient device was located in a time zone where it was daytime. A night time presentation would show that the recipient device was located in a time zone where it was night. A mobile device or recipient device, according to the invention system, may transmit a physical location of said devices to the other device automatically upon input of a physical location by a user or recipient, respectively, or such physical location may be transmitted to one or more recipient devices by input to the mobile device. In one embodiment of the invention system, a recipient device receiving location information corresponding to an specific entity or category of entities (such as peers in a communications grouping) automatically updates expanded information data stored at the recipient device, preferably without causing the recipient to detect that answer a phone call indicator of the recipient device. A mobile device receiving physical location information from a recipient device may store and time stamp each such reception of physical location so that a mapping of a recipient's movements over time can be shown on a map of the vicinity of the recipient's device. In addition, the mobile device may transmit to other recipient devices one or more of the stored and time stamped locations of the transmitting recipient device. Expanded information data also may include signals indicating that a recipient device is in motion by way of receiving signals of a motion sensor generated by the recipient device when the recipient device is in motion or vice versa.

Many mobile devices include a scheduler and/or calendar of events, some of which are input and changeable for specific dates by a user. Expanded information data includes selection of a calendar period of time whose input events on specific dates (including categorization of such events as holidays or business trips) and transmission of the calendared events data from a mobile device to one or more recipient devices adapted to receive and apply the user's calendared events data to a scheduler or calendar of events maintained by a recipient's device. Such user's calendared events are displayed as such on the recipient's device display when a recipient views outputs of the appropriate dates range by the calendar option of the recipient device. Such a recipient can easily observe event conflicts with the user of the mobile device.

State data may also local connectivity properties for the mobile device, including the above described local signal strength and also includes options available locally to the mobile device for data transfer rates and the like. The connectivity properties are compared with predetermined thresholds within a recipient device. If threshold minimum or maximum values were not obtained, certain transmissions to the mobile device would not be made. For instance, detection by a recipient device that data transfer rates were low for the local wireless communication system would prevent or would provide notification to the recipient barring transmission of large data transfers as may be indicated by media types, formatting, available compression and other such data.

Many mobile devices now are capable of interactive game play via data stream communications through the wireless network. Expanded information data may also include a mobile device user's game playing preferences which are stored after input by a user. The preferences displayed and used within the active phone book could indicate: user availability for games, game types, games roles, preferences, game player attributes.

The mobile devices of the invention system may be cellular-based (GSM or other data transmission protocols), Wi-Fi based (enabled for communications under IEEE 802.11), and/or SMS cellular-based (as described above). Transmissions and/or exchanges of information and data according to the objects of the invention may take place as packetized data transfers under session initiation protocol (SIP). Mobile and recipient devices may be capable of establishing communication via a computer network or Internet to access a database and authorization service where communication data and enhanced phonebook data of the devices may be stored and accessed only according to pre-authorization criteria.

In a locality notification embodiment, the mobile device and at least one recipient device comprise means for determining their own physical location, i.e, by input of the operator, by way of cellular tower communications or communication with a physically identified Wi-Fi network, for example. One or both of the mobile device and recipient device have means for determining that the two devices are located within a predetermined notification range, where notification is then provided through one or both devices that the other device is within said notification range. This embodiment provides the operator of a notification device that the operator of the other device is within a desired proximity and that notification is made within the menu selections of the active phonebook.

State data also may include current status of a recipient device for display at a mobile device so that a user can determine an operation of the recipient device unrelated to placing a telephone call, i.e., such as a game being played on the recipient device, the recipient is busy sending text or media, the recipient device is operating in a Wi-Fi network-preferred mode, the recipient device is web browsing via an Internet connection, etc.

The invention mobile device may incorporate means for determining a compass direction and/or speed of motion of the mobile device. This data may be stored by the mobile device so that it can be transmitted to a recipient device so that movement of the mobile device can be appreciated by the recipient.

Peer mobile to recipient devices would be allowed to (based on access rules), send arbitrary information to other devices. Information might include:
  Linked-In like request;
  request for introduction to another device (multi-step network invite);
  address card—sent direct to other authorized/approved users;
  text and data information that would be displayed as a announcement to user;
  above display based on device location; and
  above information where information could be used as coupon or be redeemed for items of value.

Enhanced information data may include transaction facilitators where a phonebook entity is a merchant with goods or services for sale and desired by the user of the mobile device. Initiating a communications session with the recipient device of the merchant optionally immediately transmits to the recipient device a request to initiate, negotiate or conclude a transaction with the user. An call from a user to a merchant transmits a query to the merchant's recipient device, which responds with, as to a queried product, availability, price, acceptance method, and confirmation method. The textual exchange and display of this transaction information speeds the transaction process for the user and the merchant. Concluding or terminating this transaction optionally causes the merchant's recipient device to initiate a new transaction leading to search screens for other products or services.

DETAILED DESCRIPTION OF THE INVENTION

The invention is now discussed with reference to the figures.

Figure 1:
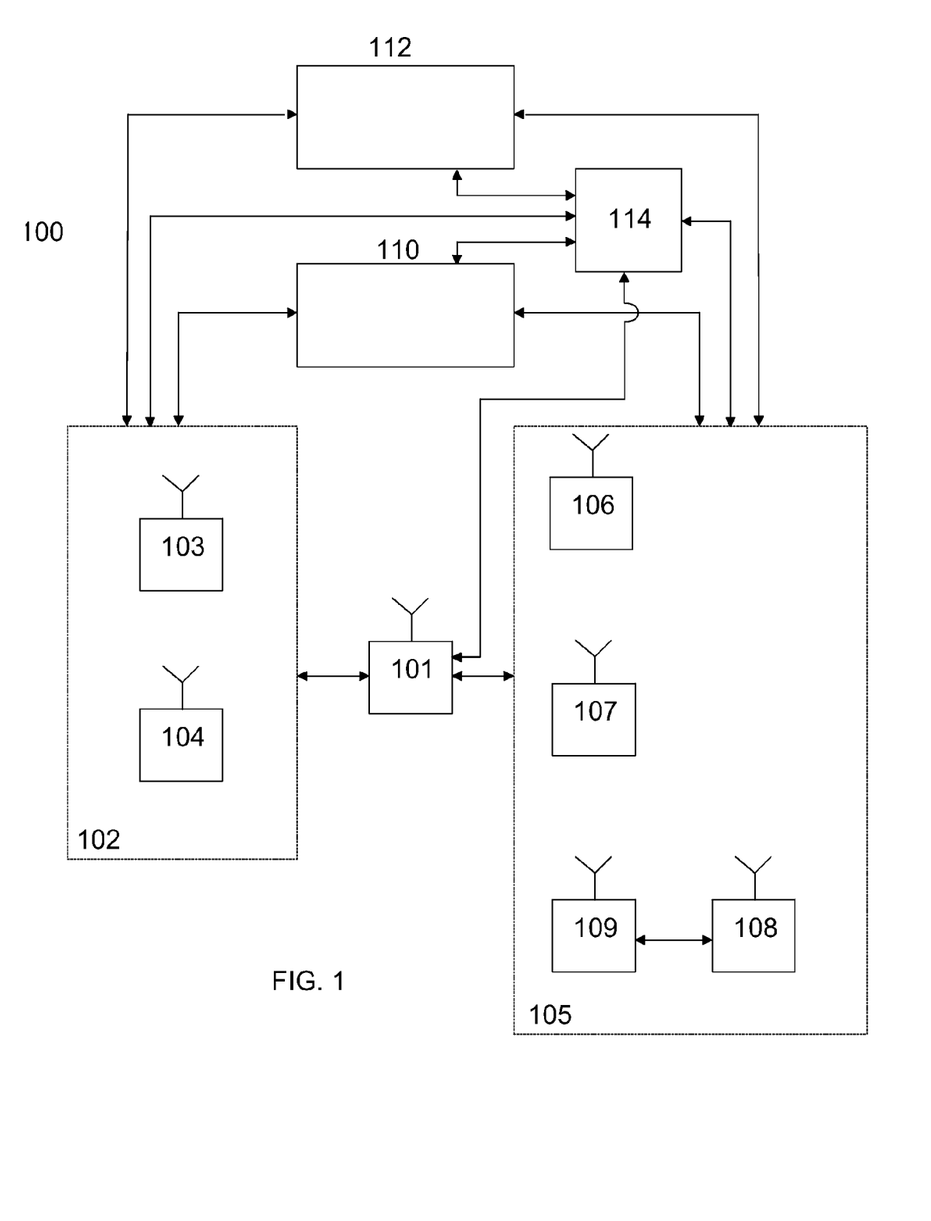
FIG. 1 is a block diagram of the invention system.

FIG. 1 shows an integrated state and enhanced information system 100 comprising a mobile device 101. Mobile device 101 comprises communications modules and means capable of establishing and maintaining wireless communications with cellular network 102, including under advanced protocols such as GSM, or Wi-Fi network 105, with said communications modules effectively connected with a communications microprocessor within mobile device 101. A control program resident in the memory of the mobile device 101 operates said microprocessor and causes the establishment of communications sessions by mobile device 101 for transmission or reception of audio and/or visual image communications. Mobile device 101 is uniquely identified by identification numbers or addresses with the cellular network 102, the Wi-Fi network 105 or under an ad-hoc, direct Wi-Fi network established with recipient device 114. It is preferred that communications sessions between the mobile device 101 and the Wi-Fi network 105 or the ad-hoc Wi-Fi network be established under one or more of the available protocols under IEEE 802.11.

Cellular network 102 comprises multiple antenna towers connected by wire or wireless connection with a computer network for providing cellular telephone communications through cellular or PSTN telephone systems 112 (or through cellular network 102 directly) with recipient 114, where such communications may include direct transmission of text and/or graphic images or video (referred to herein as "cellular communications"). Cellular communications may include SMS, which may transmit from mobile device 101 short text messages automatically or upon input from a user. Cellular network comprises a computer network 102 connected with towers 103 and 104 that are within communications range of mobile device 101. Cellular communications also include requests from mobile device 101 to the cellular network 102 for transmission of communication data relating to mobile device 101 and, if it is a subscriber to cellular network 102, to recipient device 114.

Mobile device 101 then may communicate with recipient device 114 using one or more of the following communications link means: (1) establishing an ad hoc, peer to peer Wi-Fi network for direct wireless communications; (2) establishing communications with cellular network 102 and then directly with recipient device 114 or by way of intervening Internet 110 or telephone system 112; or (3) establishing communications with Wi-Fi network 105 and then directly with recipient device 114 or by way of intervening Internet 110 or telephone system 112. Means for accomplishing the objects of the invention may be located and their functions performed among one or more of the mobile device 101, cellular network 102, Wi-Fi network 105, telephone system 112, and Internet 110. Internet 110 comprises intermediate server means for browser communications and data query, storage, access, and transmission functions, such as for captive websites administering access and information processing for the Wi-Fi network 105 and providing intermediary storage and access of communication data and enhanced phonebook data for use by the mobile device and/or the recipient device. It is preferred that as many as possible of the functions of the invention system of generating, transmitting, storing and using communication data and enhanced phonebook data be accomplished at the mobile device so as to add perceived and actual value to that device.

Figure 2:
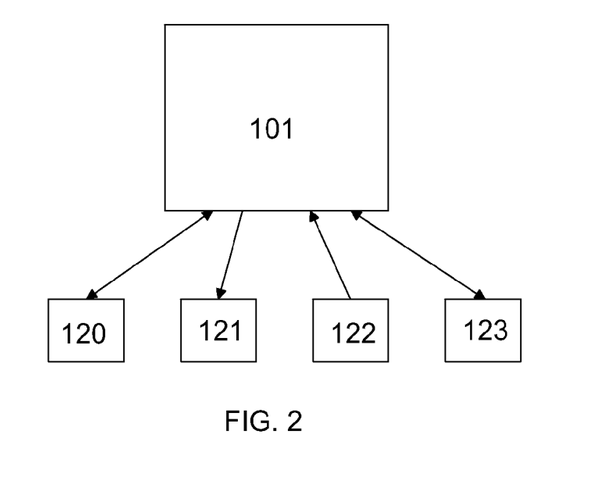
FIG. 2 is a generalized block diagram of a mobile device of the invention system.

FIG. 2 shows a high level flow diagram of a process by which the invention system establishes state data relating to the availability of a recipient device to receive a telephone call. Step 120 establishes a communications session between the mobile device and one of the communications networks available to the mobile device, such as cellular or Wi-Fi communications.

Enhanced information data, which is accessible through the phonebook menu of the mobile device, may include a physical location territory of at least one recipient device. A location of fixed device, such as a PSTN system telephone or the like, The mobile device can determine the general area or time zone of the location territory is accomplished in one of the following ways. A time zone location of a recipient device can determine a current time of day with reference to a current time of day with reference to a table of telephone number prefixes within each of the time zones of the US or a portion thereof. or the time of day in that time zone can be determined by transmission of a current time and date of the recipient device so that it is received by the mobile device and presented to the user of the mobile device for viewing on its display screen. The time of day of the recipient device may be periodically transmitted or is transmitted in response to an authorized query from the mobile device or intermediate query means. Intermediate query means comprise. The query generated by a clock linked with a microprocessor In a local determination embodiment of the invention, the cellular device receives and stores an SSID or BSSID of network 105. By comparison of the received SSID with a table of communications ranges of known Wi-Fi networks, the cellular device determines the second geographic location to be the communications territory of the Wi-Fi network 105 if that network data has been previously determined or stored. The control program may direct that the second geographic location be displayed on a liquid crystal display screen of the cellular device 101 or be transmitted to recipient 114. In all the embodiments, recipient 114 may be a device used by someone with a personal, business or other legal reason for receiving a closest physical location of the user of device 101. For instance, recipient 114 may be a personal or business relation of the user of device 101 and desires to know their physical location for the purposes of arranging a meeting. In such a case, device 101 may be configured to accept, deny or notify the user of device 101 of a request from recipient 114 to transmit a second geographical location or to limit details of thereof. If network 105 is unknown after such comparison, the control program of device 101 assigns a default transmission range to network 105 and locates that transmission range within the first geographical location as the second geographical location based upon comparing signal strengths of towers 102 and 103. FIG. 2 shows towers 102 and 103 having, respectively, communication ranges 140 and 141, with an overlap 141. Overlap 141 is the first geographic location if device 101 communicates with both tower 102 and 103.

FIG. 2 shows device 101 comprising a microprocessor with a control program and input/output means for connection to wireless communication modules 120, liquid crystal display 121, user audio interface 122, and user button interface 123. Interface 122 comprises means for audio output detectable by a user and audio input by the user.

Figure 3:
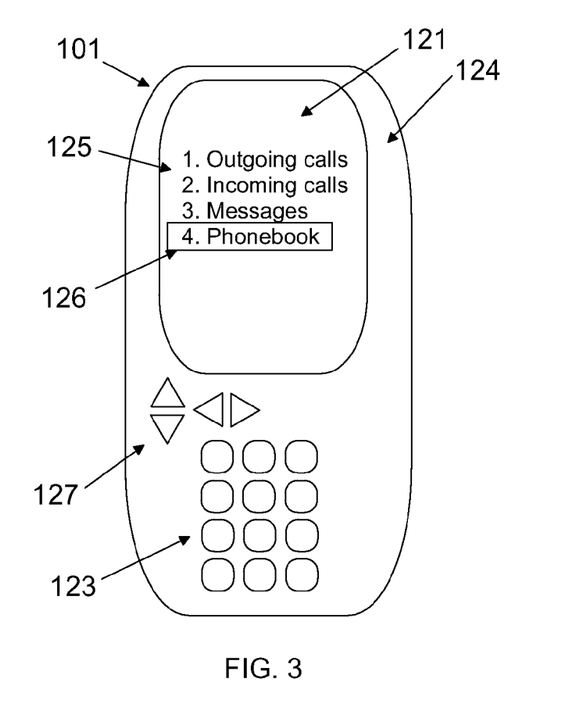
FIG. 3 is a generalized physical front view of a representative mobile device showing a display screen where a user may view information.

FIG. 3 shows a front view of a representative mobile device 101 which comprises a housing 124 supporting for presentation a liquid crystal display screen 121, a push button interface for input by a user with direction buttons 127. Screen 121 shows an upper level menu presented to a user for selection of functions of device 101. Among the available selections are the options to review previous outgoing and incoming calls, messages, and to activate a phonebook, which is highlighted. A user presses a button which causes an activation of the Phonebook functions of device 101, whereupon a next screen 121 of other functions and information is presented as in FIG. 6.

Figure 4:
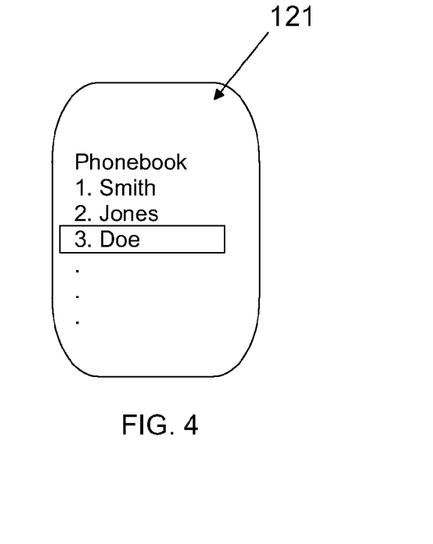
FIG. 4 is another view of the display screen of FIG. 3 but showing Phonebook entity level listings.

FIG. 4 is another view of the display screen 121 but showing Phonebook entity data, including current state and expanded information data, including items 1 through 16. This list is expanded or restricted according to functions available to device 101 and/or which are operable to obtain state or expanded information data from a recipient device. Item 1 provides a telephone number. Item 2 provides an on-line status of a recipient device by query to the recipient device, to an intermediate server, or by way of automated transmission to device 101 upon one of several triggering events (such as periodically or detection that device 101 has been turned on). Other items on the list shown in the figures which represent current or recent data about a recipient device are obtained in one of the three previous methods.

Figure 5:
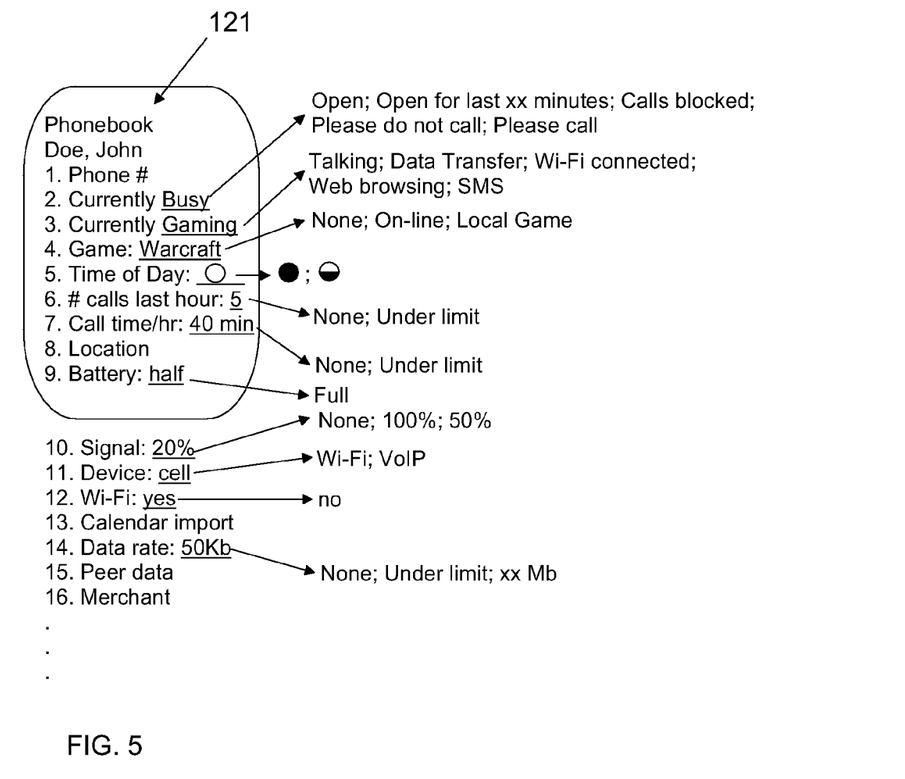
FIG. 5 is another view of the display screen of FIG. 3 but showing Phonebook entity data, including current state and expanded information data, which list of entity data is extended but viewable by a user by scrolling down.

FIG. 5 shows Item 2 having other options for indicating a current activity status of a recipient device, i.e., the line is open for phone calls, the line has been available for phone calls for a period of time, currently calls are blocked, the recipient has set a call status of calls from device 101 with a request not to call, or that the recipient has set a call status of calls from device 101 with a request to call. Other options are contemplated, as described above.

FIG. 5 shows Item 3 as indicating the recipient entity is currently conducting an online game by way of the recipient device. Alternate indications of entity data relating to current recipient activities as to device current operation are shown, in that the recipient is talking with the user of another device, that a data transfer is taking place by way of the recipient device, the recipient device is currently connected with a Wi-Fi network, the recipient is web browsing via Internet, or the recipient device is currently engaged in SMS communications.

FIG. 5 shows Item 4 as indicating the recipient entity is currently conducting an online game with the name of "Warcraft". Alternate indications of entity data relating to current recipient activities as to game types are shown, in that no games are currently being played, an on-line game is being played, or a local game resident on the recipient device is being played.

FIG. 5 shows Item 5 as indicating it is daytime at the physical location of the recipient (indicated by white center icon). Alternate indications of entity data relating to current time in the recipient's location are icons indicating nighttime (a darkened circle), or morning (a circle with a bottom half darkened FIG. 5 shows Item 6 as indicating the recipient entity has, within a specific time period, received a listed number of phone calls. Alternate indications of such a number of calls includes that no calls have been received or that the number of calls is under a limit set by the recipient, clearing the user of device 101 to place a call to the recipient.

FIG. 5 shows Item 7 as indicating the recipient entity has, within a specific time period, been engaged in phone calls. Alternate indications of a different status of the recipient are that they have had no calls or that the amount of time spent on calls is under a preset limit of the recipient.

Figure 6:
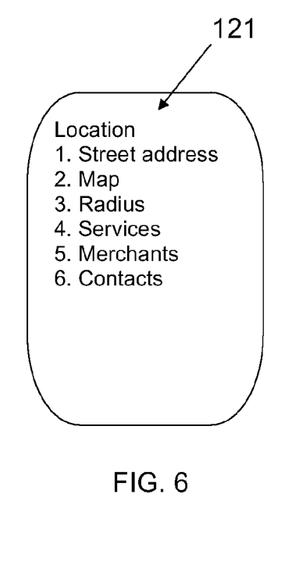
FIG. 6 is another view of the display screen of FIG. 3 but showing Phonebook entity data related to their current location.
Figure 7:
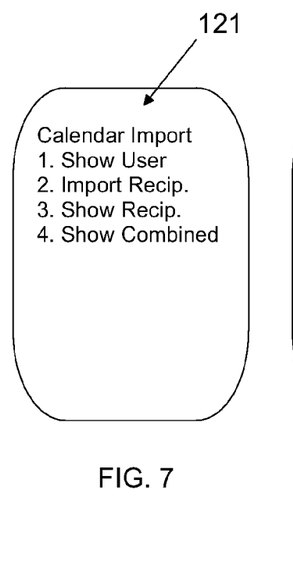
FIG. 7 is another view of the display screen of FIG. 3 but showing Phonebook entity data related to their current events input to a recipient device's calendar.
Figure 8:
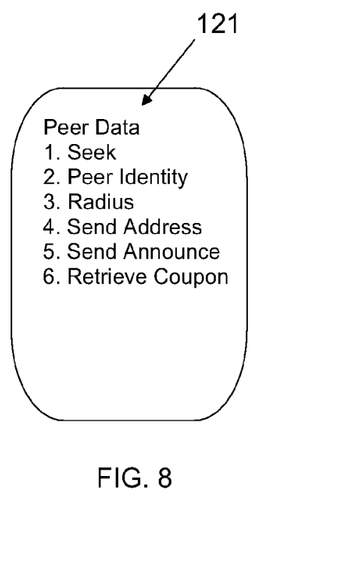
FIG. 8 is another view of the display screen of FIG. 3 but showing Phonebook entity data related to peer data.

Items 8, 13, 15 and 16 are selections which cause a new display to be shown on screen 121, respectively as in FIGS. 6, 7, and 8 for a recipient's location data, calendar and event data, and peer network data.

Referring again to FIG. 5, Item 9 indicates a current battery strength of a recipient device, if such device is wireless (other options are shown in FIG. 5). Item 10 indicates a current signal strength of a recipient device, if such device is wireless (other options are shown in FIG. 5). Item 11 indicates a current type of recipient device as being cellular (other options are shown in FIG. 5). Item 12 indicates a that the recipient device is currently Wi-Fi enabled (other options are shown in FIG. 5). Item 14 indicates a current capability for transmission and/or reception of data to the recipient device, where a wireless recipient device may be quite limited not capable of receiving data (other options are shown in FIG. 5).

FIG. 6 shows selections options relating to a current location of a recipient device. Each of the options, when selected, presents a new display. Selection options include Items 1 through 6, respectively, a street address, a representation of a portion of a vicinity map showing a location where or a territory within which the recipient device is located, a radius distance for a territory within which the recipient device is located so a user can appreciate the size of said territory, services available to a recipient within or near to said territory, merchants listed in the Phonebook of the user who are within or near to said territory, and contacts. listed in the Phonebook of the user who are within or near to said territory.

FIG. 7 shows selections options relating to a events and calendar data of a recipient device. Each of the options, when selected, presents a new display. Selection options include Items 1 through 4, respectively, to present a current calendar or list of events of the user of the device 101, an action to import (and show the status of the import) data from a recipient's device with event text and dates associated therewith, to present a current calendar or list of events of the recipient received, and to show a combined calendar or list of events of both the user and the recipient.

FIG. 8 shows selections options relating to peer to peer wireless network status of a recipient device. Each of the options, when selected, presents a new display. Selection options include Items 1 through 6 and including, respectively, a seeking of peers and report thereof, a presentation of peer identity information, a presentation of network broadcast territory, an option to transmit a user's peer to peer network address or other announcement, and to send or receive a coupon. FIG. 5 shows an Item 16 for a Merchant, which selection produces a display similar to those of FIGS. 6-8, where selection options include those presented above for specific transaction activities mediated by the invention system.

Figure 9:
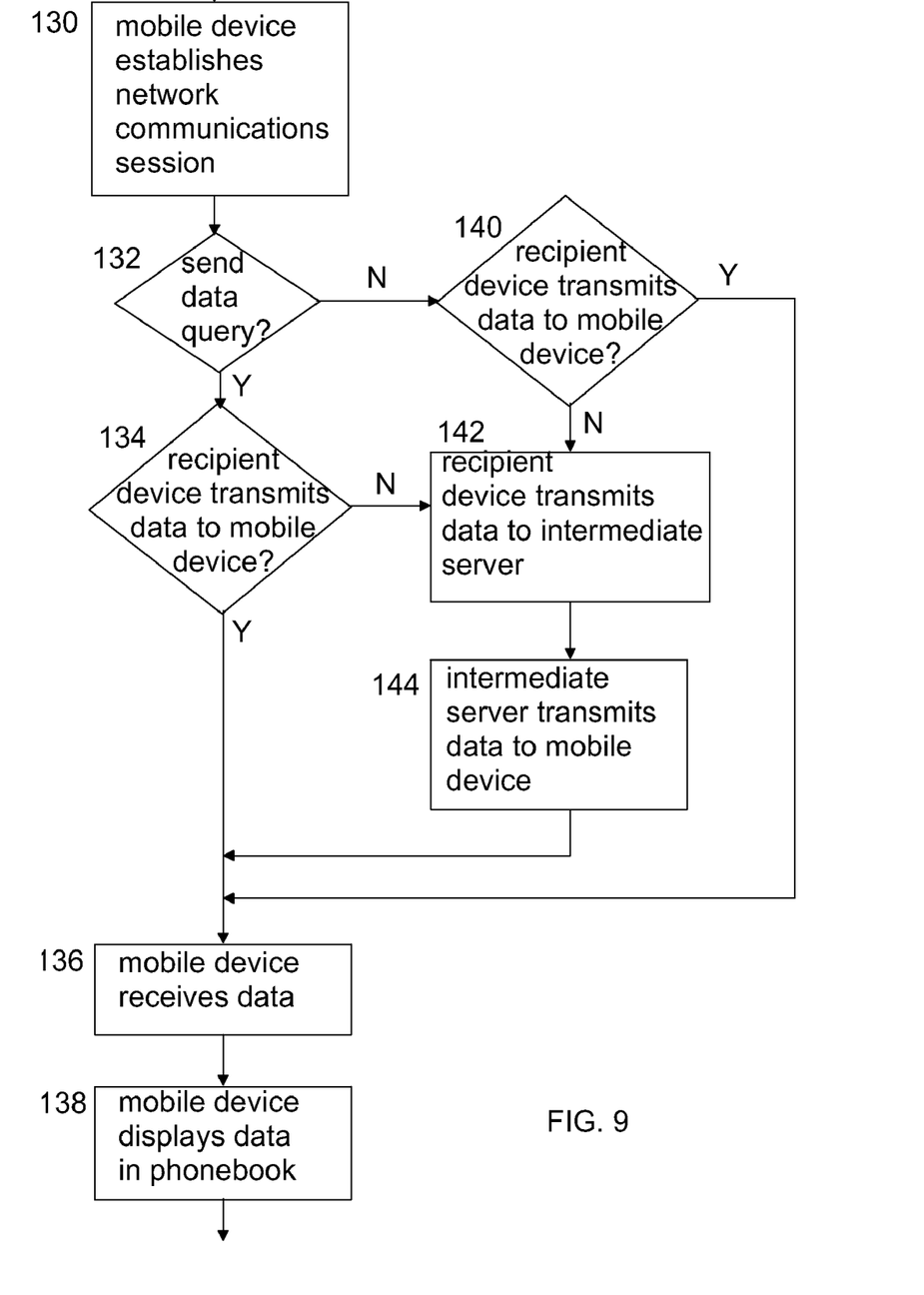
FIG. 9 is a high level flow diagram of the invention system.

FIG. 9 shows a high level flow diagram of the invention system. In step 130, a user's mobile, wireless communication device establishes a communication session with a cellular, Wi-Fi or ad hoc (peer to peer) wireless network. The cellular and Wi-Fi networks have the capability of connecting the user's device with the Internet or computer system having intermediate servers, and/or a telephone system capable of connecting the user's device in a phone call to a recipient's device.

Step 132 provides the mobile device with the option of sending a query for a recipient's state or enhanced information data. If a query is sent for said data, the mobile device may transmit with the query a confirmation code which is required by the recipient device or intermediate server (and previously authorized by the recipient device) for a right to receive said data. Step 134 provides an option for the recipient device to respond the query. If the recipient device does not respond directly to the query by the mobile device, in step 142 the recipient device transmits said data to a trusted intermediate server which stores and distributes said data according to a recipient's preset requirements.

In step 132, if no query is transmitted, the mobile device may still receive said data by non-query means. Step 140 provides an option for the recipient device to, according to preset requirements, transmit said data directly to the mobile device, which receives said data in step 136. In step 140, if the transmission is not directly to the mobile device, the recipient device transmits said data to a trusted intermediate server. The intermediate server then transmits said data to the mobile device in step 144, whereupon the mobile device receives said data in step 136. Step 138 provides for action by the mobile device to display at least some portion of said data.

The above design options will sometimes present the skilled designer with considerable and wide ranges from which to choose appropriate apparatus and method modifications for the above examples. However, the objects of the present invention will still be obtained by that skilled designer applying such design options in an appropriate manner.

We claim:

1. A wireless device comprising:
    a first communication module configured to communicate with a cellular network;
    a second communication module configured to communicate with a first Wi-Fi network;
    memory configured to store information about (i) a device and (ii) a user of the device,
    wherein the information is received via the first communication module or the second communication module, and
    wherein the information includes
        an identification of the user,
        a communication capability of the device, and
        a physical location of the device; and
    a processor configured to
        update the information based on data received from the device via the first communication module or the second communication module, and
        update the information without generating an indication that the data are being received from the device.

2. The wireless device of claim 1, wherein the first communication module or the second communication module receives the data from the device:
   in response to a request transmitted from the wireless device to the device via the first communication module or the second communication module, or
   without transmitting a request from the wireless device to the device via the first communication module or the second communication module.

3. The wireless device of claim 1, wherein the processor is further configured to:
   time stamp the data received from the device, and
   map movement of the device based on the time stamped data.

4. The wireless device of claim 1, wherein the processor is further configured to:
   determine at least one of (i) a direction of motion and (ii) a speed of motion of the wireless device, and
   communicate at least one of (i) the direction of motion and (ii) the speed of motion of the wireless device to the device via the first communication module or the second communication module.

5. The wireless device of claim 1, wherein the communication capability of the device indicates:
   whether the device is a cellular phone, a wired or wireless phone, or a Wi-Fi enabled device;
   a service provider of the device;
   a signal strength at the physical location of the device;
   a battery strength of the device;
   a data transfer rate of the device; or
   whether the device is within a broadcast range of a second Wi-Fi network.

6. The wireless device of claim 1, wherein the processor is further configured to determine,
   based on the communication capability of the device, whether to withhold or allow a type of communication with the device via the first communication module or the second communication module, and
   based on the data received from the device, whether to attempt communication with the device via the first communication module or the second communication module.

7. The wireless device of claim 1, wherein the processor is further configured to:
   determine a location of the wireless device by communicating with at least one of (i) a cellular tower associated with the cellular network and (ii) the first Wi-Fi network,
   determine, based on the location of the wireless device and the physical location of the device, whether the wireless device and the device are within a predetermined range, and
   communicate a notification to the device via the first communication module or the second communication module,
   wherein the notification indicates that the wireless device and the device are within the predetermined range.

8. The wireless device of claim 1, wherein the information further includes at least one of (i) a calendar of events of the user of the device stored in the device and (ii) a time zone and a time of day at the physical location of the device.

9. The wireless device of claim 1, wherein the processor is further configured to determine, based on the data received from the device, an operation being performed by the device, wherein the operation includes:
   a game being played,
   a type of data being communicated,
   communication in a predetermined mode, or
   surfing the Internet.

10. The wireless device of claim 1, further comprising:
   a display configured to display the information; and
   an audio interface to output the information.

11. A method for a wireless device, the method comprising:
   communicating with a cellular network via a first communication module;
   communicating with a first Wi-Fi network via a second communication module;
   receiving information from a device via the first communication module or the second communication module, wherein the information includes
   an identification of a user of the device,
   a communication capability of the device, and
   a physical location of the device;
   storing the information in the wireless device;
   updating the information based on data received from the device via the first communication module or the second communication module; and
   updating the information without generating an indication that the data are being received from the device.

12. The method of claim 11, further comprising receiving the data from the device via the first communication module or the second communication module:
   in response to a request transmitted from the wireless device to the device via the first communication module or the second communication module, or
   without transmitting a request from the wireless device to the device via the first communication module or the second communication module.

13. The method of claim 11, further comprising:
   time stamping the data received from the device, and
   mapping movement of the device based on the time stamped data.

14. The method of claim 11, further comprising:
   determining at least one of (i) a direction of motion and (ii) a speed of motion of the wireless device, and
   communicating at least one of (i) the direction of motion and (ii) the speed of motion of the wireless device to the device via the first communication module or the second communication module.

15. The method of claim 11, wherein the communication capability of the device indicates:
   whether the device is a cellular phone, a wired or wireless phone, or a Wi-Fi enabled device;
   a service provider of the device;
   a signal strength at the physical location of the device;
   a battery strength of the device;
   a data transfer rate of the device; or
   whether the device is within a broadcast range of a second Wi-Fi network.

16. The method of claim 11, further comprising:
   determining, based on the communication capability of the device, whether to withhold or allow a type of communication with the device via the first communication module or the second communication module; and
   determining, based on the data received from the device, whether to attempt communication with the device via the first communication module or the second communication module.

17. The method of claim 11, further comprising:
- determining a location of the wireless device by communicating with at least one of (i) a cellular tower associated with the cellular network and (ii) the first Wi-Fi network;
- determining, based on the location of the wireless device and the physical location of the device, whether the wireless device and the device are within a predetermined range; and
- communicating a notification to the device via the first communication module or the second communication module,
- wherein the notification indicates that the wireless device and the device are within the predetermined range.

18. The method of claim 11, wherein the information further includes at least one of (i) a calendar of events of the user of the device and (ii) a time zone and a time of day at the physical location of the device.

19. The method of claim 11, further comprising determining, based on the data received from the device, an operation being performed by the device, wherein the operation includes:
- a game being played,
- a type of data being communicated,
- communication in a predetermined mode, or
- surfing the Internet.

20. The method of claim 11, further comprising:
- displaying the information on a display of the wireless device; and
- outputting the information via an audio interface of the wireless device.

* * * * *